(12) United States Patent
Melnyk et al.

(10) Patent No.: US 8,741,474 B2
(45) Date of Patent: Jun. 3, 2014

(54) BATTERY ASSEMBLY

(71) Applicant: Milwaukee Electric Tool Corporation, Brookfield, WI (US)

(72) Inventors: Steven G. Melnyk, Grafton, WI (US); Scott D. Bublitz, Hartland, WI (US); Chris Conrad, Germantown, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 13/645,843

(22) Filed: Oct. 5, 2012

(65) Prior Publication Data

US 2013/0089764 A1 Apr. 11, 2013

Related U.S. Application Data

(60) Provisional application No. 61/544,889, filed on Oct. 7, 2011.

(51) Int. Cl.
| | | |
|---|---|---|
| *H01M 2/00* | (2006.01) | |
| *H01M 2/02* | (2006.01) | |
| *H01M 6/08* | (2006.01) | |
| *H01M 2/08* | (2006.01) | |
| *H01M 2/04* | (2006.01) | |
| *H01M 2/10* | (2006.01) | |

(52) U.S. Cl.
USPC ........... 429/178; 429/163; 429/164; 429/175; 429/176; 429/177; 429/179; 429/180; 429/185; 429/186; 429/187

(58) Field of Classification Search
None
See application file for complete search history.

(56) References Cited

U.S. PATENT DOCUMENTS

| | | |
|---|---|---|
| 4,554,221 A | 11/1985 | Schmid |
| 5,704,803 A | 1/1998 | Oshima et al. |
| 5,707,757 A | 1/1998 | Lee |
| 6,232,013 B1 | 5/2001 | Clarke et al. |
| 6,339,312 B2 | 1/2002 | Sakaue et al. |
| 6,342,773 B2 | 1/2002 | Sakaue et al. |
| 6,424,117 B1 | 7/2002 | Vejraska |
| 6,627,345 B1 | 9/2003 | Zemlok et al. |
| 6,783,886 B1 | 8/2004 | Sakakibara et al. |
| 6,949,309 B2 | 9/2005 | Moores, Jr. et al. |
| 7,014,945 B2 | 3/2006 | Moores, Jr. et al. |
| 7,141,331 B2 | 11/2006 | Ziegler et al. |
| 7,189,473 B2 | 3/2007 | Smith et al. |
| 7,238,443 B2 | 7/2007 | Sakakibara |
| 7,326,490 B2 | 2/2008 | Moores, Jr. et al. |
| 7,572,547 B2 | 8/2009 | Sakakibara |

(Continued)

FOREIGN PATENT DOCUMENTS

| | | | | |
|---|---|---|---|---|
| JP | EP 2421067 | * | 2/2012 | .............. H01M 2/10 |
| KR | 2020000015586 | | 5/2000 | |

*Primary Examiner* — Patrick Ryan
*Assistant Examiner* — Yoshitoshi Takeuchi
(74) *Attorney, Agent, or Firm* — Michael Best & Friedrich LLP

(57) ABSTRACT

A battery assembly includes a housing having an inside surface and an outside surface. The outside surface has a bottom portion, a side portion, and a junction portion between the bottom portion and the side portion. The inside surface defines an internal cavity, and a drain aperture extends through the wall from the outside surface to the cavity at the junction portion. At least one battery cell is disposed within the cavity. A contact is coupled to the housing and is in electrical communication with the battery cell.

4 Claims, 4 Drawing Sheets

(56) References Cited

U.S. PATENT DOCUMENTS

| | | |
|---|---|---|
| 7,733,054 B2 | 6/2010 | Phillips et al. |
| 7,736,792 B2 | 6/2010 | Moores, Jr. et al. |
| 7,897,278 B2 | 3/2011 | Tsai et al. |
| 7,993,772 B2 | 8/2011 | Sakakibara |
| 2001/0046624 A1* | 11/2001 | Goto et al. .............. 429/99 |
| 2002/0094473 A1 | 7/2002 | Lin |
| 2003/0129482 A1* | 7/2003 | Zhou et al. .............. 429/100 |
| 2007/0122692 A1 | 5/2007 | Smith et al. |
| 2007/0264536 A1 | 11/2007 | Mizoguchi |
| 2009/0072785 A1 | 3/2009 | Moon |
| 2010/0167110 A1* | 7/2010 | Johnson et al. .............. 429/91 |
| 2010/0221591 A1 | 9/2010 | Roβkamp et al. |
| 2011/0039142 A1 | 2/2011 | Kwag et al. |
| 2011/0129703 A1 | 6/2011 | Han |
| 2011/0250487 A1 | 10/2011 | Nakashima et al. |

* cited by examiner

BATTERY ASSEMBLY

CROSS-REFERENCE TO RELATED APPLICATION

This application claims priority to U.S. Provisional Patent Application No. 61/544,889, filed Oct. 7, 2011, the entire contents of which are incorporated herein by reference.

BACKGROUND

The present invention relates to batteries, and in particular, the invention relates to a battery pack housing of a battery assembly.

Battery assemblies, or battery packs, may be detachably coupled to a variety of power tools, lamps, and instruments. Because battery assemblies are used under a variety of environmental conditions, moisture may enter the battery assembly as liquid water or vapor. The accumulation of moisture can lead to a variety of problems, including corrosion or short circuits.

SUMMARY

In one embodiment, the invention provides a battery assembly. A battery housing includes a wall having an inside surface and an outside surface. The outside surface has a bottom portion, a side portion, and a junction portion between the bottom portion and the side portion. The inside surface defines an internal cavity, and a drain aperture extends through the wall from the outside surface to the cavity at the junction portion. At least one battery cell is disposed within the cavity. A contact is coupled to the housing and is in electrical communication with the battery cell.

In another embodiment the invention provides a battery assembly. A battery housing includes a wall having an inside surface and an outside surface. The outside surface has a bottom portion, a side portion, and a junction portion between the bottom portion and the side portion. The inside surface defines an internal cavity. A plurality of drain apertures extend through the wall from the outside surface to the cavity at the junction portion. The junction portion defines a drain channel extending across each of the plurality of drain apertures from the bottom portion to the side portion. At least one battery cell is disposed within the cavity. A contact is coupled to the housing and is in electrical communication with the battery cell.

In yet another embodiment the invention provides a battery assembly. A battery housing includes a wall having an outside surface and an inside surface. The outside surface includes a bottom portion, a first side portion, a first junction portion between the bottom portion and the first side portion, a second side portion separate from the first side portion, and a second junction portion between the bottom portion and the second side portion and separate from the first junction portion. The inside surface defines an internal cavity. A first drain aperture extends through the wall from the outside surface to the cavity at the first junction portion. A second drain aperture extends through the wall from the outside surface to the cavity at the second junction portion. The first junction portion defines a first drain channel extending across the first drain aperture from the bottom portion to the first side portion and the second junction portion defines a second drain channel extending across the second drain aperture from the bottom portion to the second side portion. At least one battery cell is disposed within the internal cavity. A contact is coupled to the housing and in electrical communication with the at least one battery cell.

Other aspects of the invention will become apparent by consideration of the detailed description and accompanying drawings.

BRIEF DESCRIPTION OF THE DRAWINGS

FIG. 3A is a detail view of the battery assembly of FIG. 3.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
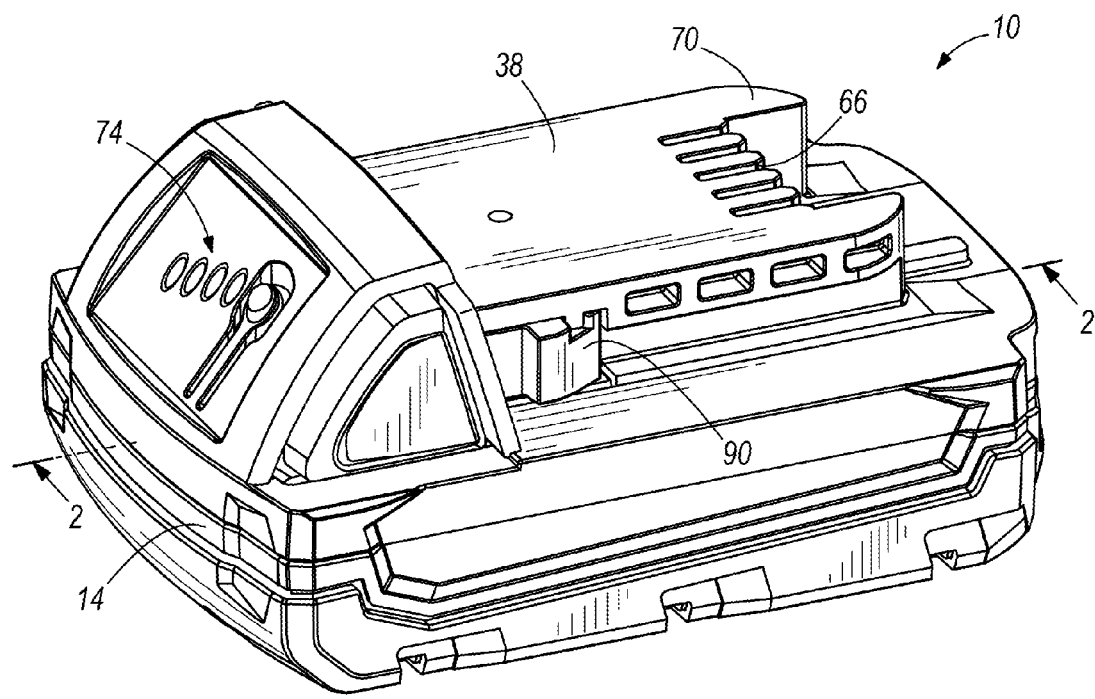
FIG. 1 is a perspective view of a battery assembly according to one construction of the invention.

FIG. 1 illustrates a battery assembly 10, such as for powering a power tool. The battery assembly 10 includes a battery housing 14 and, with reference to FIG. 2, battery cells 18.

Figure 2:
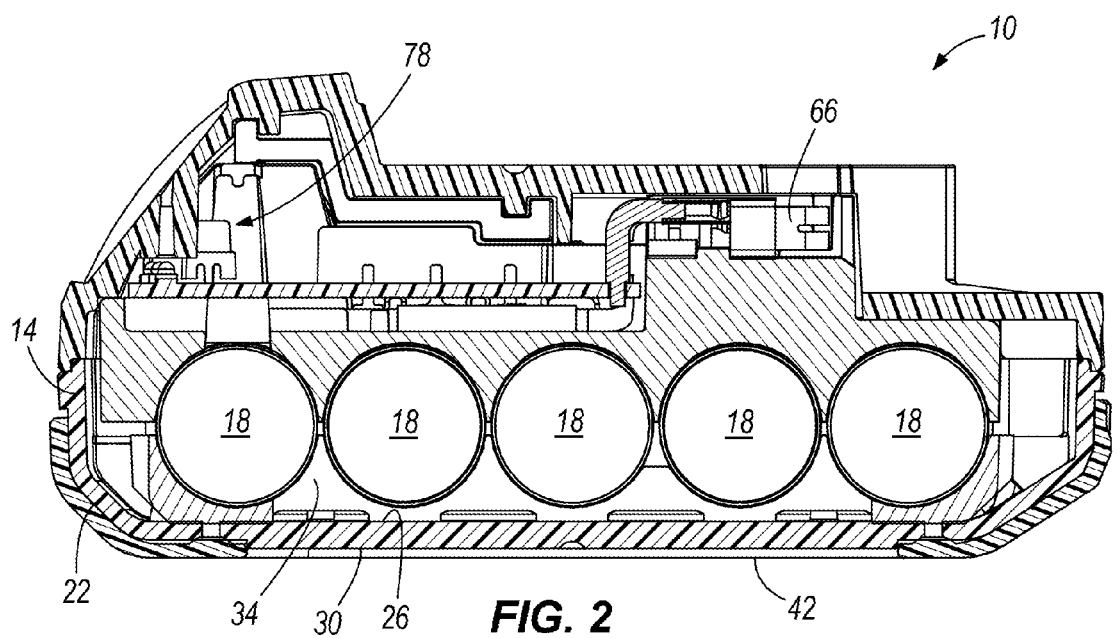
FIG. 2 is a cross sectional view of the battery assembly along section line 2-2 of FIG. 1.

With continued reference to FIG. 2, the battery housing 14 includes a wall 22 having an inside surface 26 and an outside surface 30. The inside surface 26 defines an internal cavity 34. The outside surface 30 includes a top surface portion 38 (FIG. 1) and a bottom portion 42 (FIG. 3).

Figure 3:
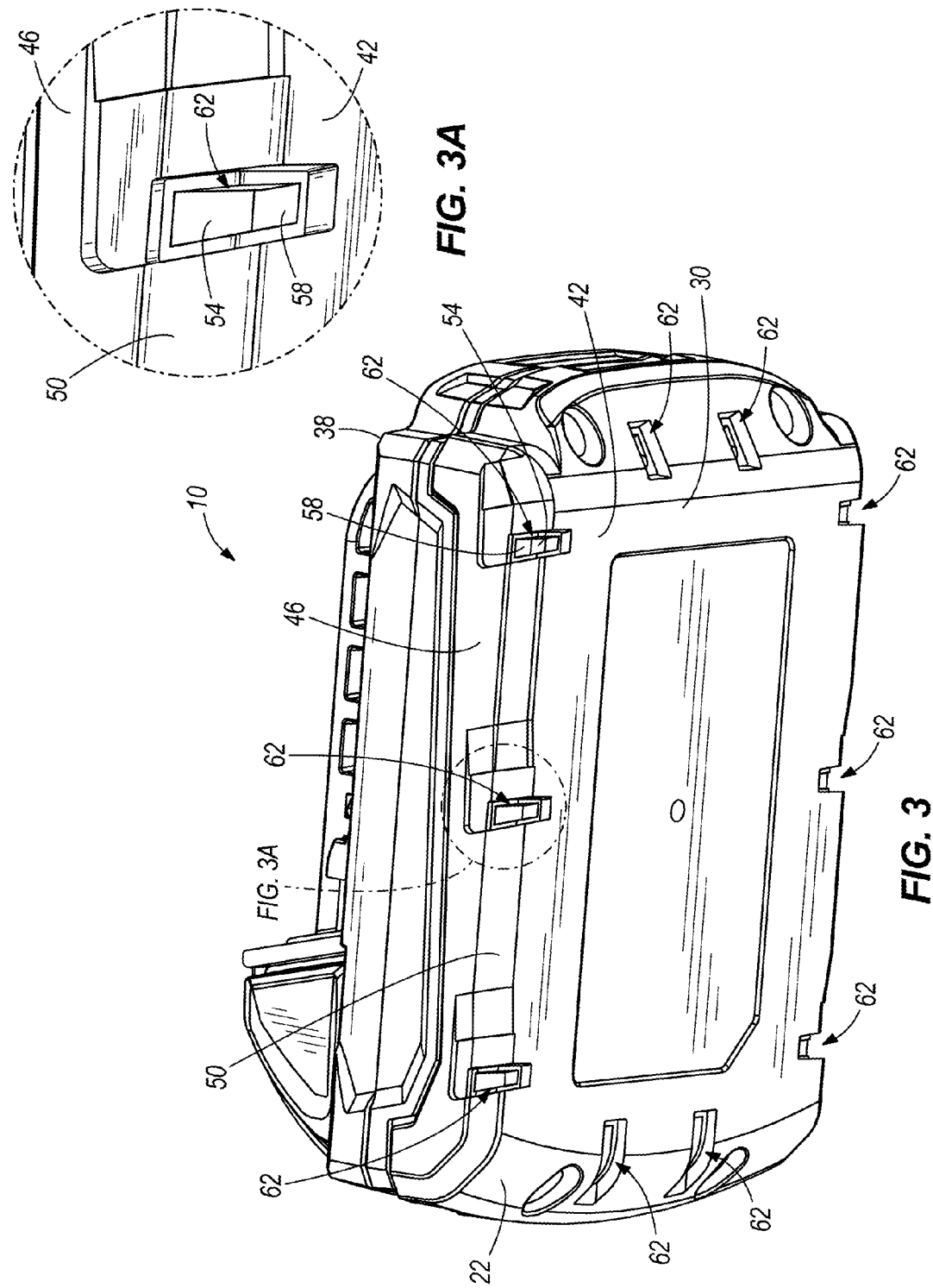
FIG. 3 is an opposing perspective view of the battery assembly of FIG. 1.

As illustrated in FIG. 3, four side portions 46 extend between the top surface portion 38 and the bottom portion 42. A junction portion 50 is defined between the bottom portion 42 and each side portion 46.

Still referring to FIG. 3, the housing wall 22 defines drain apertures 54 extending from the outside surface 30 to the cavity 34 (FIG. 2) at the junction portion 50. Each of the drain apertures 54 has a substantially rectangular cross section, but may also include other various cross-sectional shapes. As illustrated in FIG. 3A, a drain channel 58 extends across the junction portion 50 from the bottom portion 42 to the side portion 46 over each aperture 54. The drain aperture 54 is substantially centered within the drain channel 58. Together, each drain channel 58 and drain aperture 54 define a weep hole 62. In the construction illustrated in FIGS. 1-3, ten weep holes 62 are defined. The weep holes 62 provide a path for water and other contaminants to flow from the cavity 34 to the outside surface 30.

Referring to FIG. 2, the battery cells 18 disposed within the cavity 34 are connected in series to battery contacts 66. Referring back to FIG. 1, the contacts 66 (FIG. 2) are disposed on the top surface portion 38, within a battery contact housing extension 70. The housing extension 70 is configured to matingly engage with one or more power tools or powered accessories. A battery charge level indicator 74 is also disposed on the housing (FIG. 1), while additional battery charging, monitoring, and indication components 78 are disposed within the cavity 34 (FIG. 2). As shown in FIG. 1, two tabs 90 are coupled to the housing 14 for releasably securing the housing 14 to a power tool.

Figure 4:
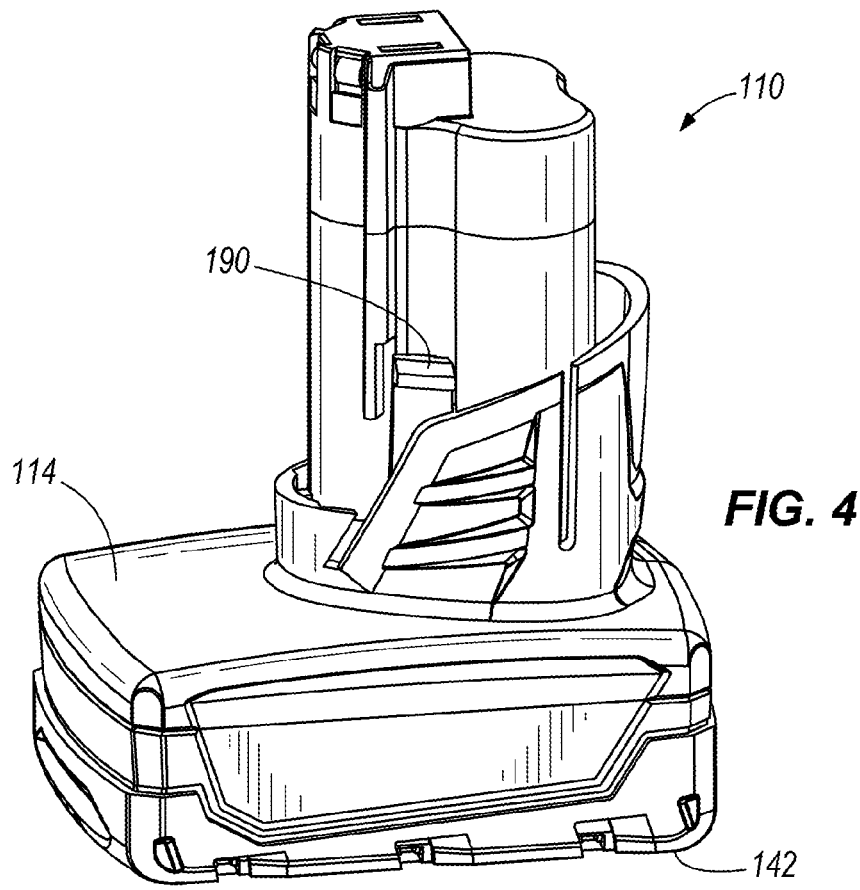
FIG. 4 is a perspective view of a battery assembly according to another construction of the invention.
Figure 5:
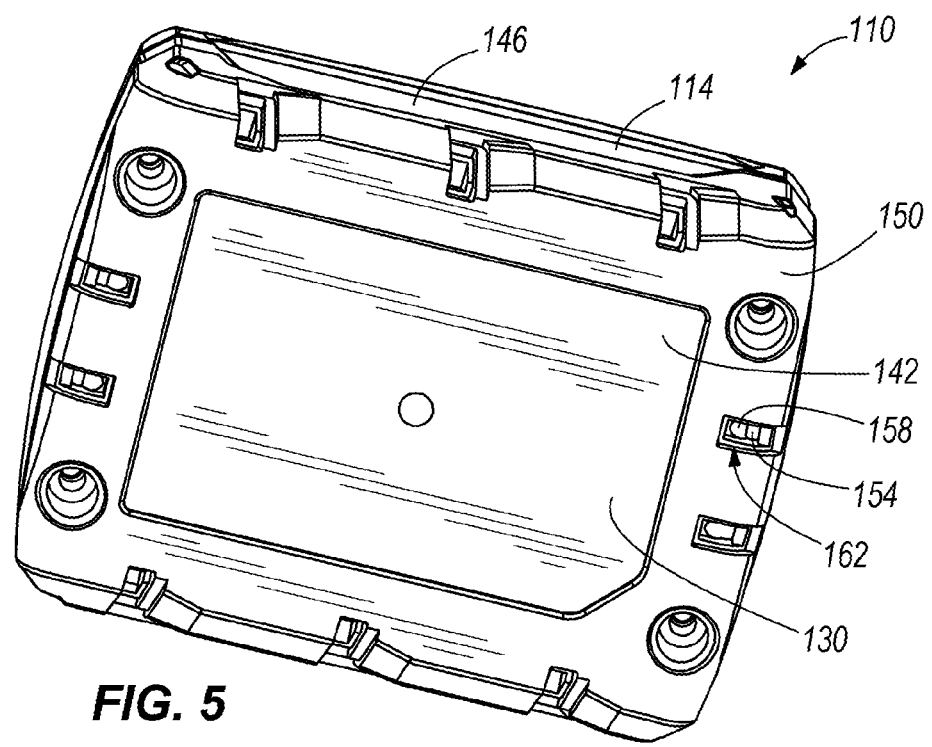
FIG. 5 is an opposing perspective view of the battery assembly of FIG. 4.

FIGS. 4 and 5 illustrate a battery assembly 110 according to another construction of the invention. Similar features to those described with respect to FIGS. 1-3 have been given similar reference numbers with a prefix of 1. Referring to FIG. 4, the battery assembly 110 includes a housing 114 having a bottom portion 142. Two tabs 190 are formed in the housing 114 for releasably securing the housing 114 to a power tool.

As shown in FIG. 5, the bottom portion 142 of the housing 114 includes drain apertures 154. A drain channel 158 extends across a junction portion 150 from the bottom portion 142 to a side portion 146 over each aperture 154. Together, each drain channel 158 and each drain aperture 154 define a weep hole 162.

Figure 6:
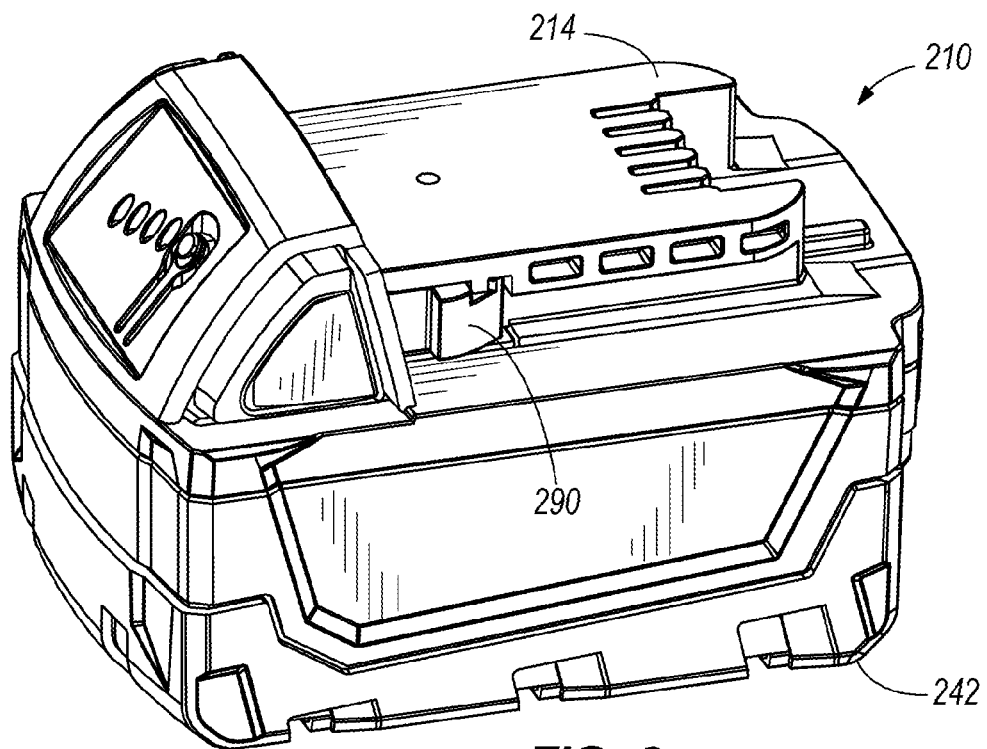
FIG. 6 is a perspective view of a battery assembly according to yet another construction of the invention.
Figure 7:
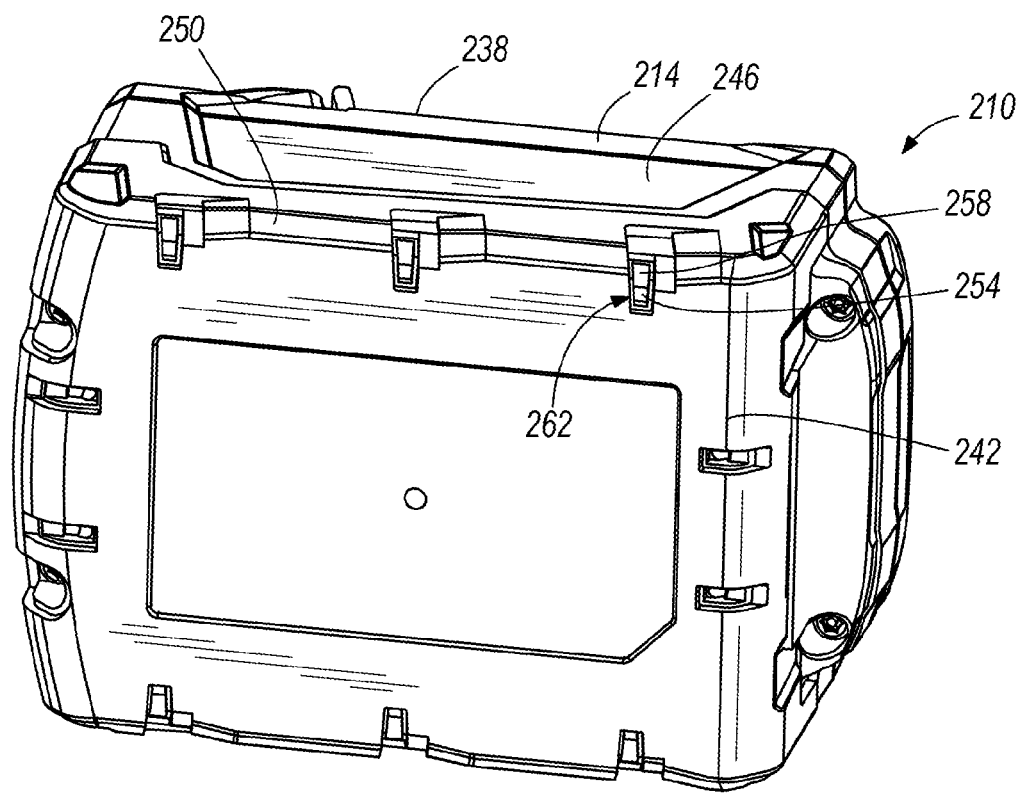
FIG. 7 is an opposing perspective view of the battery assembly of FIG. 6.

FIGS. 6 and 7 illustrate a battery assembly 210 according to another construction of the invention. Similar features to those described with respect to FIGS. 1-3 have been given similar reference numbers with a prefix of 2. FIG. 6 illustrates the battery assembly 210 having a housing 214 and a bottom portion 242. Two tabs 290 are formed in the housing 214 for releasably securing the housing 114 to a power tool.

Referring to FIG. 7, the bottom portion 242 of the housing 214 includes drain apertures 254. A drain channel 258 extends across a junction portion 250 from the bottom portion 242 to a side portion 246 over each aperture 254. Together, each drain channel 258 and each drain aperture 254 define a weep hole 262.

Various features and advantages of the invention are set forth in the following claims.

The invention claimed is:

1. A battery assembly comprising:
    a battery housing including
        a wall having an outside surface and an inside surface, the outside surface including a bottom portion, a side portion, and a beveled junction portion between the bottom portion and the side portion, the inside surface defining an internal cavity,
        a drain channel located on the wall so that an opening of the drain channel is within the beveled junction portion, wherein the drain channel does not extend through the wall from the outside surface to the cavity, and
        a drain aperture having an opening with a smaller cross-sectional area than the opening of the drain channel, the drain aperture disposed along a center portion of the drain channel, wherein the drain aperture extends through the wall from the outside surface to the cavity at the junction portion;
    at least one battery cell disposed within the internal cavity; and
    a contact coupled to the housing and in electrical communication with the battery cell,
    wherein the battery assembly is for a power hand tool.

2. The battery assembly of claim 1, wherein the drain channel and the drain aperture define a weep hole.

3. The battery assembly of claim 1, wherein the drain aperture has a substantially rectangular cross section.

4. The battery assembly of claim 1, further comprising a battery charge level indicator disposed on the housing.

* * * * *